United States Patent [19]

Callahan

[11] Patent Number: 5,249,350
[45] Date of Patent: Oct. 5, 1993

[54] TRIMMED RECOMPRESSED HAY BALES AND FORMATION PROCESS THEREFOR

[76] Inventor: I. Dean Callahan, P.O. Box 205, Royal City, Wash. 99357

[21] Appl. No.: 5,783

[22] Filed: Jan. 19, 1993

Related U.S. Application Data

[63] Continuation-in-part of Ser. No. 845,208, Mar. 3, 1992, abandoned.

[51] Int. Cl.⁵ .............................................. B27B 1/00
[52] U.S. Cl. ................................. 29/426.2; 29/426.3; 144/376
[58] Field of Search .................. 29/426.1, 426.2, 426.3, 29/412, 33 P, 564; 83/425.2; 144/376, 378; 414/111

[56] References Cited

U.S. PATENT DOCUMENTS

| 6,243 | 1/1875 | Dodge . |
| 258,273 | 5/1882 | Bacon . |
| 275,366 | 4/1883 | Dederick . |
| 496,042 | 4/1893 | Dederick . |
| 764,924 | 7/1904 | Dederick . |
| 1,890,802 | 12/1932 | Apple . |
| 3,099,802 | 7/1963 | Klemm et al. . |
| 3,381,072 | 4/1968 | Mutton et al. . |
| 3,509,926 | 5/1970 | Morris . |
| 3,888,150 | 6/1975 | Stroud et al. . |
| 3,982,868 | 9/1976 | Rinker . |
| 4,022,094 | 5/1977 | Hetherington . |
| 4,024,808 | 5/1977 | Molitorisz . |
| 4,031,790 | 6/1977 | Arvidson . |
| 4,057,141 | 11/1977 | Laurie et al. . |
| 4,068,549 | 1/1978 | Huffman . |
| 4,098,154 | 7/1978 | Whitten . |
| 4,270,423 | 6/1981 | Angelo . |
| 4,416,312 | 11/1983 | Ostberg . |
| 4,688,614 | 8/1987 | Jenkner . |
| 4,823,664 | 4/1989 | Cooper, Jr. et al. . |
| 4,884,682 | 12/1989 | Weder et al. . |
| 4,907,325 | 3/1990 | Hsu . |

Primary Examiner—Timothy V. Eley
Attorney, Agent, or Firm—Keith S. Bergman

[57] ABSTRACT

Recompressed rectilinear hay bales or split portions thereof have one or both opposed sides not supporting ties trimmed to provide new planar surfaces of fresher and more pleasing appearance. The process of forming such bales provides 1) placing an elongate field bale having spaced ties extending about four continuous sides in a recompression chamber, 2) removing the original ties from the bale while maintaining the compression, 3) recompressing the bale a direction parallel to its longer dimension by approximately sixty-five percent, 4) retying the recompressed bale with new ties on the same four continuous bale sides while maintaining the recompressed condition, 5) removing the recompressed bale from the recompressor and optionally cutting it into two similar parts between ties, 6) passing the bale or bale portions adjacent at least one saw blade to trim at least one original bale surfaces not supporting ties, and 7) removing the bale and trimmed material for further disposition.

6 Claims, 2 Drawing Sheets

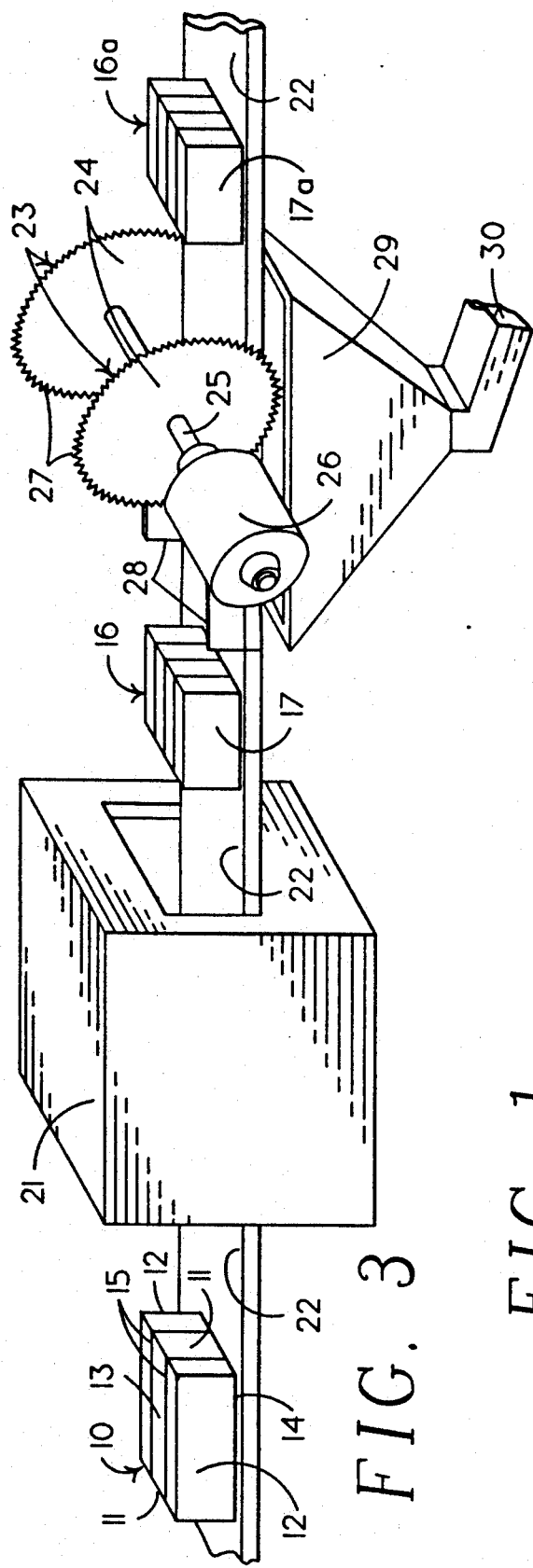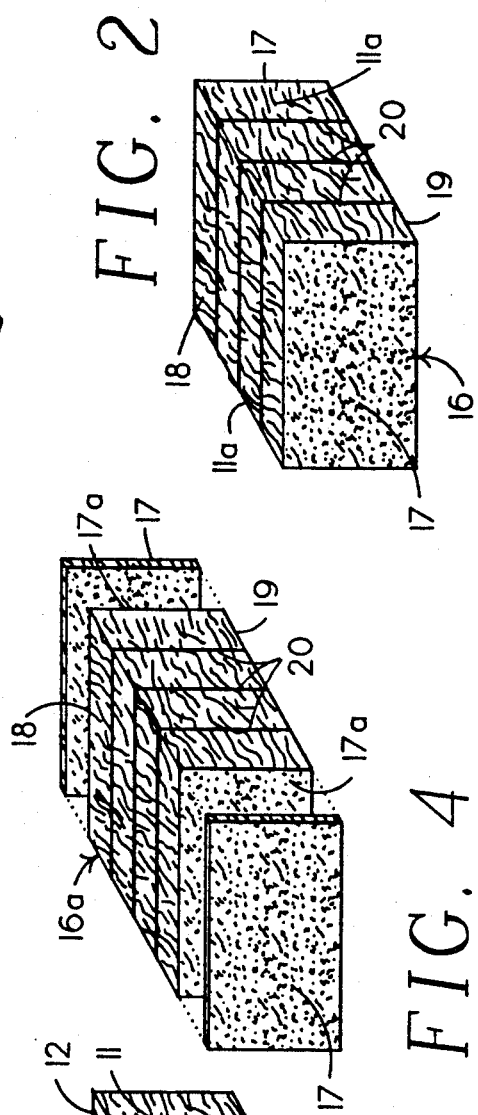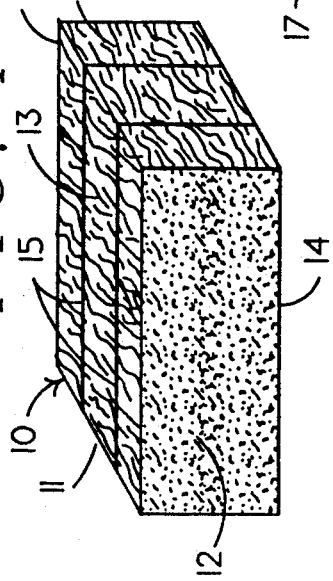

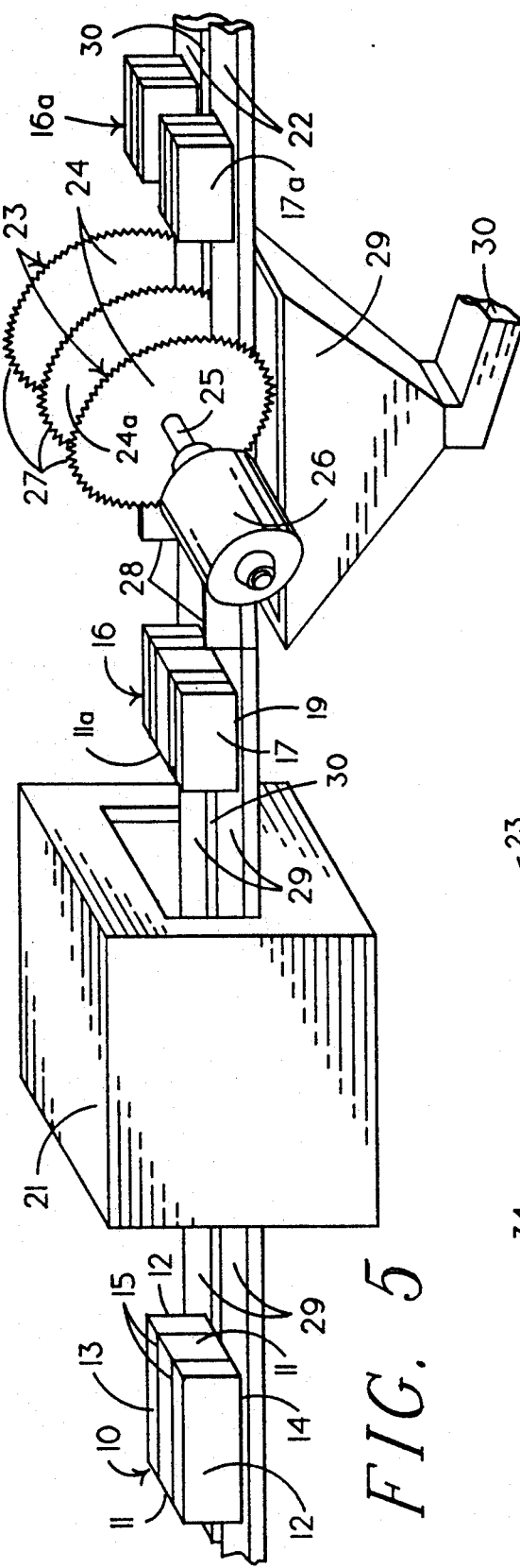
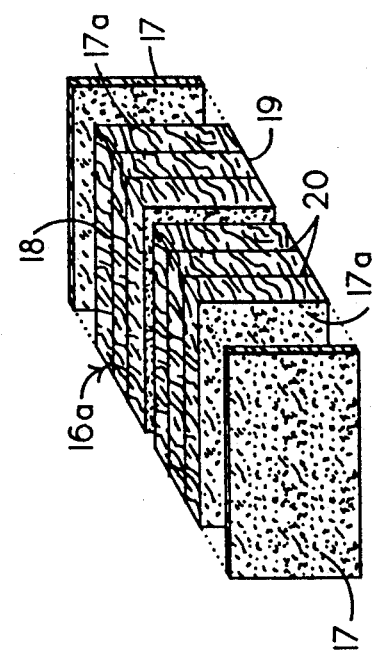
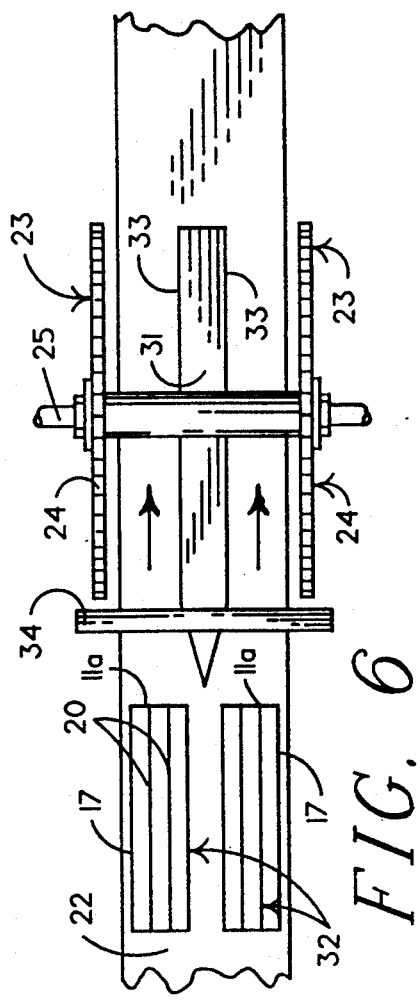

TRIMMED RECOMPRESSED HAY BALES AND FORMATION PROCESS THEREFOR

This is a continuation-in-part of Ser. No. 07/845,208 filed on Mar. 3, 1992 which is now abandoned.

BACKGROUND OF INVENTION

1. Field of Invention

This invention relates generally to recompressed bales of previously compressed fungible materials, and more particularly to trimming one or both opposed surfaces of such a hay bale or bale portion that do not have supporting ties.

2. Description of the Prior Art

Loose field produced hay is a massive, low value, low density product that generally is compressed in bales to make it economically viable for storage, transport and handling, as well as to aid its preservation, to maintain its nutrative value and to provide an aesthetically pleasing appearance to both consuming animals and buyers. The compression process and the product produced by it in their historical evolutionary courses have taken many and various forms to meet the requirements of particularized uses ranging from relatively small pelletized product that is of no more than one inch in any dimension and has no external fastening structures to massive bales weighing one ton or more with a plurality of external configuration maintaining fasteners. One common form that hay bales have taken is that of a parallelepiped with generally two to four ties extending about two ends and the top and bottom. This type of bale is common in Western hay farming and is predominately used as the basis for a product for international export. This type of bale for convenience of reference will be referred to as a "Western field bale".

Such bales are commonly initially formed by similar baler apparatus and processes that accumulate cured cut hay in a generally horizontally oriented, elongate chamber with two vertical side edges. The cut hay is placed in this chamber with its stems more or less horizontally oriented and extending somewhat perpendicularly between the vertical sides so that the sides include many stem ends and bent and broken stem portions. When hay has been accumulated in a sufficient mass in the baler chamber, it is compressed by pressure applied between the vertical ends and parallel to the sides. Two to four ties are placed about the compressed bale extending between the ends and over the top and bottom inwardly adjacent each vertical side. This type of bale has become reasonably standardized in two sizes, a first of approximately 48×18×16 inch dimension with two spaced ties extending about the first two dimensioned surfaces and a second of approximately 48×23×16 inches with three or four spaced ties extending about the same surfaces. The first bale has a weight usually ranging between approximately 80 to 100 pounds and the second between 100 to 130 pound, depending on the type of hay material and its moisture content.

Such hay bales tend to be too bulky for economical transport in international commerce, and they are therefore commonly recompressed. Recompression is carried out in a chamber having substantially the same cross-sectional configuration as that of the original field bale and pressure is again applied between the ends of the bale to compress the original forty-eight inch dimension to an ultimate dimension of approximately fourteen to twenty-two inches. During the recompression process, the original bale ties are removed and new ties established to maintain the configuration of the recompressed bale. The new ties are normally three or four in number and extend about the same bale surfaces as the original ties, all spacedly adjacent each other and inward of each bale vertical side. It is with this type of recompressed Western field bale that my invention is concerned.

Such recompressed bales have vertical sides which do not support ties that are quite rough and irregular, with outer portions which are substantially less dense than the interior portion of the bale. These vertical sides also are generally of a different color and of less nutrative value for live stock by reason of their exposure to the elements and oxidation occurring during the normal bale curing and drying process and storage periods prior to recompression. This bale material immediately inwardly of the vertical sides of a recompressed bale is of lesser economic value, of lower density than the rest of the bale, and tends to cause voids in a stacked mass of bales, either by itself or in combination with similar surfaces of other adjacent bales. My invention solves these problems by trimming at least one vertical side surface of such recompressed bales.

It has become common in dealing with such recompressed bales, especially in the Japanese export trade, to split such bales into two similar halves, parallel to the side edges not supporting ties and between existing ties. The slitting normally is accomplished after recompression by a knife and the bales normally are fastened with four ties so that each half portion will have two ties for configurational maintenance. This type of slit bale will normally have only one rough surface requiring trimmings.

If approximately one-half inch of the original vertical side surface of recompressed bales is removed, the then existing surface is of substantially the same density as the remaining portion of the bale and that surface will be of a green color characteristic of unbleached and unoxidized baled hay. The cut surface is substantially planar to allow the future stacking and storage of such bale for transport or otherwise without voids between adjacent bale surfaces, and since the new surface will be substantially adjacent some other bale surface, reconfiguration tends to substantially lessen further oxidative and bleaching activity.

The fresh colored, compact uniform surface created by the trimming operation has been found to create substantial appeal to buyers in the export market for such trimmed hay, especially in the Japanese trade. The trimming process provides an additional benefit in that the material removed from the bale may be recycled for use as feed in its original form or especially as enhanced by other animal nutrient materials.

SUMMARY OF INVENTION

My invention generally provides a recompressed Western field hay bale or a half of such bale with at least one original vertical side trimmed to a planar parallel surface approximately one-half inch inwardly of the original side of the bale. Such trimmed bales are formed by a process comprising: 1) placing a field bale of hay in the compression chamber of a bale recompressor, 2) removing the bale ties from said bale while in the recompression chamber, 3) recompressing said bale in a lengthwise direction to an ultimate length of approximately one-third and less than one-half of its original length, 4) retying the recompressed bale about its nonvertical sides while maintaining its compression, 5) removing the recompressed tied bale from the recompressor apparatus, 6) optionally slitting the bale into two similar halves parallel to its vertical sides prior to trimming, 7) passing at least one original vertical sides of the recompressed bale through a saw to remove approximately one-half inch of the vertical bale side, 8) optionally slitting the bale into two similar halves parallel to its vertical sides during the trimming process, and 9) removing both the bale and trimmer bale material for further disposition.

In providing such a bale and formation process therefore, it is:

A principal object to create a recompressed hay bale or slit bale having the outer portions of the vertical sides trimmed to remove less dense discolored hay originally forming the vertical surfaces of the bale.

A further object is to provide such a trimmed bale or slit that has substantially planar parallel vertical sides that are formed of hay having substantially the same density as the hay in the interior of the bale.

A further object is to provide such a bale or slit bale that has vertical sides with a fresh green appearance similar to that of freshly baled hay.

A still further object is to provide such a bale or slit bale that may be stacked in a massed array of similar bales in a more compact fashion and with less voids than could be done with untrimmed bales and one that is particularly adaptable to stacking in containers for foreign export commerce.

A still further object is to provide such a bale or slit bale and a process to produce it that are of new and novel design, of rugged and durable nature, of simple and economic nature and are otherwise well adapted for the uses and purposes for which they are intended.

Other and further objects of my invention will appear from the following specification and accompanying drawings which form a part hereof. In carrying out the objects of my invention, however, it is to be remembered that its accidental features are susceptible of change in design and structural arrangement and ordering, with only one preferred and practical embodiment of the best known mode being specified and illustrated as is required.

BRIEF DESCRIPTION OF DRAWINGS

In the accompanying drawings which form a part hereof and wherein like numbers of reference refer to similar parts throughout:

FIG. 1 is an isometric surface view of an ordinary Western field hay bale showing its general configuration and construction.

FIG. 2 is an isometric surface view of the bale of FIG. 1 recompressed in a lengthwise direction for international commerce.

FIG. 3 is a semi-diagrammatic orthographic view of for simultaneously trimming both vertical sides of a whole recompressed bale.

FIG. 4 is an expanded isometric view of a trimmed bale produced by the apparatus of FIG. 3 showing the portions trimmed from the vertical sides thereof.

FIG. 5 is a semi-diagrammatic orthographic view of a second species that simultaneously trims both vertical sides of a bale and also slits the bale into two similar half bales.

FIG. 6 is a semi-diagrammatic plan view of a third species that trims either original vertical side of a bale that has been previously slit.

FIG. 7 is an expanded isometric surface view of a trimmed slit bale produced by the apparatus of FIG. 6, showing the bale portions and the trimmed portions.

DESCRIPTION OF THE PREFERRED EMBODIMENT

A typical Western field hay bale 10 as illustrated in FIG. 1 is a parallelepiped with similar ends 11, similar opposed vertical sides 12, and similar top 13 and bottom 14. The bale is configurationally maintained in a compressed state by similar spaced elongate ties 15, usually two to four in number, each arrayed substantially parallel to the other and passing across the opposed ends, top and bottom of the bale. Each tie 15 is positioned spacedly inwardly and substantially parallel to the adjacent vertical sides 12. Such bales commonly have a length between ends of approximately forty-eight inches, a width between vertical sides of approximately eighteen or twenty-three inches and a height between top and bottom of approximately sixteen inches. These dimensions have become reasonably standardized in field bales for hay produced in the Western United States. Depending upon the nature of hay material contained in such bale, its compaction and its moisture content, such bales commonly contain a hay mass of some eighty to one hundred thirty pounds. The ties 15 may be formed from various flexible durable elongate material of appropriate strength to hold the bale together, but most commonly in the present day they are formed of so-called "binder twine" which is a stranded, semi-twisted cord of polymeric or resinous plastic fiber. Wire has been used for purposes of bale fastening, but has been found to present hazards for animals subsequently eating baled hay and because of this the use of wire is not common in the present day haying practice. Solid plastic strapping or banding is increasingly being used for such fastening. All of such fasteners are for convenience referred to herein as "ties".

Such field bales are generally formed in transitory baling machines that provide an elongate peripheraly defined chamber of substantially the same size as the cross-sectional dimensions of the bale to be formed. Hay is placed in such chamber so that the hay stems are arrayed to extend more or less perpendicularly between vertical sides 12. The ends of elongate stems of hay that normally would project beyond the limits of vertical sides 12 are folded back upon themselves and into the interior of the bale as it is being formed. The vertical sides of such bale therefore comprise a substantial portion of stem ends and stems folded upon themselves and a much higher proportion of such structures than any other portion or surface of the bale. The vertical sides of a bale and the area inwardly adjacent thereto are by reason of this structure more porous and somewhat less dense than the inner portions of the bale. Compaction of the bale is commonly accomplished by pressure applied between the bale ends and this compressing action again tends to maintain and preserve the rougher and less dense structure at the vertical side surfaces 12.

The rough and irregular nature of the vertical sides of such bales and their lower density tend to allow weathering and oxidation more readily than on other bale surfaces or than in the interior of a bale. This action is noted most commonly by a change in color of the hay on the weathered or oxidized surface from an original brighter green color to a grayish green or brown-green, and oftentimes to a grayish tan or brown which with ultimate weathering can darken to approach black. This coloration often is used by farmers and other persons concerned with hay, and possibly even by the animals consuming it, as an indicator of the hay quality and age, though it may not be a scientifically accurate or even a particularly useful indicator. Because of this, the color of hay sold in commerce becomes of some importance in attempting to judge hay quality and is influential in determining ultimate hay price.

The discoloration of a hay bale along its opposed vertical sides is further enhanced by the common methods of bale storage. Baled hay generally is aged in the field for a period of time to allow some curing and drying and is then stacked in closely massed array with other bales to allow completion of the curing and drying processes and to store the hay until it is needed. Stacking of a plurality of bales by reason of custom and the configurational relationships of the bales themselves is commonly accomplished with the elongate dimension of bales extending in a horizontal direction, in orientation such as illustrated in FIG. 1. In this orientation, vertical bale sides 12 will either be exposed in a stack, adjacent other vertical sides, or adjacent more than one other bale end. In any of such cases stacked bales tend to cause somewhat of a void adjacent the vertical sides 12. This array of bales tends to allow the passage of air and moisture into and through a stack of baled hay and tend to retain these materials once they pass into the stack, all to further enhance the weathering process and color change in the vertical side surfaces 12 of the bales. The weathering process is even more accentuated on bales that form the outside surface of a stack to further enhance the discoloration of these surfaces.

In dealing with field bales, particularly in their storage and transport, it has been found that normally sized bales of dry cured hay be substantially recompressed without materially harming the hay, to provide a bale of substantially smaller size that is much more economical to deal with in international commerce. The practice of recompressing such field bales has become almost universal in such commerce. A recompressed bale 16 is shown in FIG. 2. This bale again comprises a parallelepiped having opposed ends 11a, similar opposed vertical sides 17, top 18 and bottom 19. The bale is tied with parallel opposed ties 20 in a fashion similar to the original field bale, except that in this case the ties are normally three or four in number and shorter than those of the original field bale.

Such recompressed bales 16 are formed in a machine designed specifically for this purpose. Field bales 10 enter a recompression machine 21 and are at least partially contained in a chamber of the same cross-sectional configuration as the original field bale. The ties 15 are cut and removed from the bale and it is then compressed in a direction between its opposed ends 11a. The bale is then retied with new ties 20 extending about the same sides as the original ties 15. Such recompression in most common recompression machines results in a bale having a recompressed length between opposed ends of between fourteen to twenty-two inches, which constitutes recompression of from approximately two to three hundred percent. Recompressed bales 16 are then removed from the recompressing machine for disposition.

It has become common in the recent past to split such recompressed bales by a slit extending parallel to the vertical sides and medially therebetween. Such bales are commonly slit by forcing them through a channel carrying a stationary knife in approximate position. If recompressed bales are to be slit, they commonly have four ties so that each slit portion may have two ties and there will be no medial tie which could be cut in the slitting process.

Such recompressed bales, by reason of the nature of the recompression process, maintain the various hay elements within their confines in substantially the same orientation and relationship as in the original bale. The recompression process merely makes the entire mass of the bale more dense and lessens the total volume of voids in the hay material itself and between the various elements of that hay material. Such recompressed bales thusly retain substantially the same vertical side structure as existed in the original field bale before recompression. There may be some compression of the vertical bale sides in the recompression process, but those sides still remain less dense and a less consolidated form than the medial portions of the same bale. Since there is no positional change in the material from which the vertical sides are formed during recompression process, that material maintains its same discolored and aged appearance that it originally had before recompression. My invention becomes operative at this stage of the recompression process to trim the original vertical sides of such a recompressed bale.

As seen in FIG. 3, bale 10 is recompressed in recompressor apparatus 21 and exits from this process as recompressed bale 16 onto transport conveyor 22 whereon it is moved for further processing. In the instance shown, the bale 16 exits the recompressor apparatus from a horizontal position, but various of the processors of commerce may cause a bale to exit from a vertical position onto the upper surface of conveyor 22. When the bale exits from most present day recompressing apparatus, it is in the orientation illustrated with vertical sides 17 positioned adjacent the lateral edges of conveyor 22, and one end 11a facing forwardly and the other end 11a facing rearwardly on the conveyor. If the manner of exit of a recompressed bale from a recompressing apparatus be different or if the bale be oriented otherwise than as described, it is reoriented on the conveying apparatus as described by means and methods well known in the conveyor transport art.

Transport conveyor 22 has upwardly projecting dogs (not shown) or similar devices to engage a hay bale and positively move the bale along the conveyor against some amount of resistive force. The width of the conveyor, that is its dimension perpendicular to its course of transit, at least at the trimming station, is somewhat less than the ultimate trimmed width of a recompressed bale between its opposed vertical sides 17a to allow trimming of a bale while it is being supported and moved along the transport conveyor 22.

Downstream of the recompressor apparatus 21, I provide compound saws 23, in the instance illustrated in FIG. 3 providing two similar spaced vertically oriented circular saw blades 24 carried on a common arbor 25 which is driven for rotary motion by motor 26. Saw blades 24 are of such size that they can cut the opposed vertical sides 17 of a recompressed hay bale passed between them with the arbor 25 positioned above the compressed bale 16. To accomplish this function the saw blades commonly are of about thirty-six inch diameter to cut bale sides 17 having a vertical height of sixteen inches. The teeth 27 of saw blades 24 are preferably of a type heretofore known for the cutting of baled hay. The distance between saw blades 24 is equal to the desired ultimate width of recompressed trimmed bale 16a and somewhat greater than the width of transport conveyor 22 so that the saws can operate laterally adjacent the conveyor as described.

Commonly approximately a one-half inch slab will be removed from each vertical side 17 of the recompressed bale, and this normally will require a width between saw blades for an ordinarily sized Western field bale of between seventeen and twenty-two inches, in the case of such a bale having an original width of between eighteen and twenty-three inches. The actual amount removed from a hay bale may vary within limits and remain within the scope of my invention, though practical considerations dictate that no more hay should be removed than necessary while the amount removed should yet leave a reasonably dense, clean, fresh appearing surface.

Though a single compound circular saw is described for simultaneously trimming bale sides, various other saw types, saw positioning and saw arrays are within the scope of my invention. Each bale side may be sequentially trimmed at different positions along the conveyor, independently mounted saws rather than a single compound saw having two spaced blades on a common arbor may be used, and band saws rather than circular saws may be used all as known in the hay bale cutting arts. A particularly advantageous saw arrangement provides two spaced saw blades on a first common arbor to cut slightly more than the upper half of a bale and two other spaced saw blades on a second common arbor to cut slightly more than the lower half of the bale, with the two sets of saw blades spaced in the direction of motion of a bale being trimmed so as not to interfere with each other.

Immediately upstream of saw 23, transport conveyor structure 22 provides upstanding guide rails 28 which are oriented with converging angulation in the direction of the motion of travel of the conveyor to center a hay bale passing therebetween on the conveyor so that both sides of the bale will be substantially equally trimmed by reason of the symmetrical positioning of the saw blades relative to the conveyor.

A hopper 29 having output orifice 30 is positioned beneath the conveyor 22 at the position of saw 23 to receive material trimmed from recompressed bales. Such material removed from trimmed bales is salvagable as a by-product, for use either directly as animal fodder or as a component for reprocessing with other animal nutrients into various animal foods.

The trimmed recompressed bale 16a after passing through saw 23 is moved on transport conveyor 22 for ultimate disposition. The trimmed bale produced by my process will be compressed in an elongate direction between ends by an amount of generally more than 50 percent, to a length dimension of approximately fourteen to twenty-two inches, depending upon the compression desired, the initial bale density before recompression and the apparatus in which the recompression process is carried out. The top, bottom and ends of the recompressed bale will be of substantially the same condition as those particular surfaces of the field bale before recompression as they remain substantially unchanged. The vertical side surfaces 17a, however, will be trimmed to substantially planar surfaces having a fresh appearance and a density similar to that of the interior portions of the bale.

A second species of my apparatus that slits a bale into two similar elongate portions while trimming the sides is illustrated in FIG. 5. The overall structure and process are quite similar to those of the first primary species.

Here, however, a third circular saw blade 24a is carried by arbor 25 in a medial position between saw blades 23 that cut the sides 17 of recompressed bale 16. To accommodate this third saw blade 24a the transport conveyor is divided into two laterally adjacent conveyor portions 29, with space 30 therebetween to accommodate the lowermost portion of saw blade 24a without interference. This conveyor structure may be accomplished by using two separate spacedly adjacent conveyors as illustrated, or by using a single conveyor with a medial channel defined therein to allow the medial saw blade to extend low enough to cut the bottom 19 of a bale 16. With this species of my apparatus, a recompressed bale 16 may be slit into two similar half portions and the original vertical sides simultaneously trimmed to provide the product illustrated in FIG. 7.

A third species of my apparatus that trims one original vertical side of a previously slit bale is illustrated in FIG. 6. Here again the overall structure and process are quite similar to those of the first species.

Divider 31 directs each half 32 of a split bale laterally outwardly on conveyor 22 to a position where it is maintained in a trimming position by opposed guide sides 33 which maintain the original vertical side of the bale relative to one of the opposed saw blades 24. The divider 31 and guide sides 33 are supported by frame 34 on the conveyor structure other external support independent of the conveyor. With this species of my apparatus, the original vertical side surfaces of either half of a split bale 32 may be trimmed in a similar fashion to the original sides of a unitary unsplit bale. Commonly this type of split bale will have two ties for configurational maintenance as illustrated, though this is not necessary for my trimming process.

It should be particularly noted from the process described that since ties 20 that encompass the recompressed bale 16 are spacedly inwardly of opposed vertical sides 17, those ties will not be disturbed in the bale trimming process of my invention, but rather remain undisturbed in the same position as when originally placed.

It should further be noted that only a small amount of material is removed from a hay bale, not more than approximately some four to five pounds, so that the bale retains substantially its entire initial mass.

The foregoing description of my invention is necessarily of a detailed nature so that a specific embodiment of it might be set forth as required, but it is to be understood that various modifications of detail, rearrangement, reordering and multiplication of parts might be resorted to without departing from its spirit, essence or scope.

Having thusly described my invention, what I desire to protect by Letters Patent, and

What I claim is:

1. In a hay bale structure formed by recompressing a Western field bale of hay, originally having a length of approximately forty-eight inches, between opposed ends, said bale structure having plural parallel spaced ties encircling the top, bottom and ends spacedly inwardly adjacent the vertical sides and being recompressed in a direction between its ends to a dimension of between fourteen and twenty-two inches, the invention comprising:

trimming at least one original vertical side of the recompressed bale to create a planar vertical side surface substantially parallel with the original surfaces and having a fresher appearing color, a smoother surface and a density higher than that of the original untrimmed surface and substantially the same as the internal portion of the bale.

2. The article of claim 1 further characterized by each opposed side surface of the recompressed bale being trimmed by sawing to remove not more than one inch of original bale material.

3. The article of claim 1 further characterized by:
the recompressed bale being slit into two elongate portions by a vertical slit parallel to the vertical sides and medially therebetween; and
the original vertical side surface of the slit bale portion being trimmed by sawing to remove not more than one inch of original bale material.

4. A process for creating a trimmed recompressed bale of hay from a Western field bale originally having a length of approximately forty-eight inches between opposed ends, said bale having plural parallel spaced ties encircling the top, bottom and ends spacedly inwardly adjacent the vertical sides, comprising:
placing the field bale in a recompression apparatus, removing the original ties from the field bale while maintaining the bale compression;
recompressing the field bale between its ends to create a recompressed bale of the same cross-section as the original field bale but with a length less than half the original bale length;
retying the recompressed bale with plural ties encircling the top, bottom and ends spacedly inwardly of the vertical sides by an distance greater than the thickness to be trimmed from the sides;
removing the recompressed bale from the recompression apparatus onto a conveyor, with the bale orientated with its vertical sides substantially parallel to the direction of bale travel;
moving the bale on the conveyor medially between spaced opposed saw blades to trim portions of not more than approximately one inch from each vertical side of the recompressed bale; and
removing the bale for disposition.

5. The process of claim 4 further characterized by the opposed saw blades being carried on a common arbor with a third similar saw blade medially therebetween to slit the recompressed bale into elongate half portions.

6. The process of claim 4 further characterized by:
the recompressed bale being slit into two similar portions after recompression and before trimming by a medial slit parallel to its vertical sides, and
each bale portion being moved adjacent one of the spaced saw blades to remove not more than one inch of the original vertical side of the bale.

* * * * *